(12) United States Patent
Nixon et al.

(10) Patent No.: US 9,416,831 B2
(45) Date of Patent: Aug. 16, 2016

(54) SYSTEMS AND METHODS FOR ALTERNATING MATERIAL BRAKE DISK STACK

(71) Applicant: Goodrich Corporation, Charlotte, NC (US)

(72) Inventors: Thomas Dwayne Nixon, Akron, OH (US); Steven Thomas Keller, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 54 days.

(21) Appl. No.: 13/791,075

(22) Filed: Mar. 8, 2013

(65) Prior Publication Data
US 2014/0251739 A1 Sep. 11, 2014

(51) Int. Cl.
*F16D 55/36* (2006.01)
*F16D 65/12* (2006.01)
*F16D 65/00* (2006.01)

(52) U.S. Cl.
CPC ............... *F16D 55/36* (2013.01); *F16D 65/12* (2013.01); *F16D 2200/0047* (2013.01); *F16D 2200/0052* (2013.01); *Y10T 29/49826* (2015.01)

(58) Field of Classification Search
CPC ............... F16D 2055/0004; F16D 2055/0075; F16D 55/36; F16D 65/00; F16D 65/12; F16D 655/125; F16D 2065/13; F16D 2065/1304; F16D 2069/001; F16D 2069/002; F16D 2200/0047; F16D 2200/0052
USPC ......... 188/71.5, 73.1, 218 XL, 218 R, 251 R, 188/251 A, 250 B
See application file for complete search history.

(56) References Cited

U.S. PATENT DOCUMENTS

| | | | |
|---|---|---|---|
| 5,803,210 A * | 9/1998 | Kohno et al. ................ | 188/73.1 |
| 6,532,637 B1 * | 3/2003 | Niespodziany et al. ..... | 29/401.1 |
| 6,855,428 B2 | 2/2005 | Lau | |
| 7,378,362 B2 | 5/2008 | Nixon | |
| 8,261,891 B2 * | 9/2012 | Thebault et al. ........... | 188/251 A |
| 2006/0151912 A1 * | 7/2006 | Bauer ........................... | 264/257 |
| 2008/0135680 A1 * | 6/2008 | Scelsi et al. .................. | 244/111 |
| 2008/0142314 A1 * | 6/2008 | Scelsi et al. ................. | 188/73.1 |
| 2009/0069169 A1 * | 3/2009 | Bauer .......................... | 501/95.2 |

* cited by examiner

*Primary Examiner* — Melody Burch
(74) *Attorney, Agent, or Firm* — Snell & Wilmer L.L.P.

(57) ABSTRACT

Dissimilar aircraft brake systems for use in, for example, an aircraft are provided herein. In this regard, a system is provided comprising a carbon/carbon ("C/C") rotor disk adjacent to a ceramic matrix composite ("CMC") stator disk. In various embodiments, a system is provided comprising a CMC rotor disk adjacent to a C/C stator disk.

11 Claims, 6 Drawing Sheets

SYSTEMS AND METHODS FOR ALTERNATING MATERIAL BRAKE DISK STACK

FIELD

The present disclosure is related to systems and methods for an alternating material brake disk stack for use in, for example, an aircraft.

BACKGROUND

Aircraft often include one or more landing gear that comprise one or more wheels. Each wheel may have a brake that is operatively coupled to the wheel to slow the wheel, and hence the aircraft, such as, for example, during landing or a rejected take off. Aircraft brakes typically comprise, among other things, a brake disk stack. The brake disk stack typically comprises rotor disks and stator disks that, in response to axial compressive pressure, absorb the kinetic energy of a rotating wheel. Various brake disk stacks may have poor static friction performance that varies greatly in response to environmental conditions (e.g., hot or cold, wet or dry). Conventional brake disk stacks may have larger ranges or standard deviation coefficients of dynamic friction that vary greatly in response to the type of braking operation performed (e.g., landing or rejected take off). Thus, there is a need for improved systems and methods relating to aircraft brakes.

SUMMARY

Systems and methods disclosed herein may be useful in aircraft brake systems. In this regard, a brake disk stack is provided comprising a carbon/carbon ("C/C") rotor disk adjacent to a ceramic matrix composite ("CMC") stator disk. In further embodiments, a brake disk stack is provided comprising a C/C stator disk adjacent to CMC rotor disks.

A method of manufacturing a brake disk stack is provided comprising disposing a carbon/carbon ("C/C") rotor disk in the brake disk stack and disposing a ceramic matrix composite ("CMC") stator adjacent to the C/C rotor disk. A further method of manufacturing a brake disk stack is provided comprising disposing a CMC rotor disk in the brake disk stack and disposing a C/C stator adjacent to the CMC rotor disk.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

The detailed description of exemplary embodiments herein makes reference to the accompanying drawings, which show exemplary embodiments by way of illustration and its best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or perforated by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed herein may be useful for brake disk stacks for use in aircraft. Aircraft may comprise one or more types of aircraft wheel and brake assemblies. For example, an aircraft wheel and brake assembly may comprise a non-rotatable wheel support, a wheel mounted to the wheel support for rotation, and a brake disk stack (also referred to as a brake assembly). An aircraft brake disk stack generally comprises a friction brake mechanism including a pressure plate that is adjacent to a means for exerting force such as a hydraulic piston motor or one or more electromechanical actuators. Force may be exerted through, for example, one or more rams.

An aircraft brake typically further comprises an end plate distal from the means for exerting force and a plurality of interleaved rotor disks and stator disks which together form the brake heat sink. Each rotor disk may be coupled to the wheel for rotation therewith and each stator disk is coupled to the wheel support against rotation. The friction brake mechanism also generally includes a torque tube and a back leg on which a pressure plate, end plate and stator disks are slidably mounted against rotation relative to the wheel and rotor disks. The stator disks may comprise two wear faces and the pressure plate may comprise a single wear face. The rotors disks and stator disks may be formed of a friction material, such a C/C material or a CMC material, as described herein. A brake head may house the piston motor or one or more rams that extend to move the pressure plate and axially compress the brake disk stack against the end plate.

The actuator rams may be electrically operated actuator rams or hydraulically operated actuator rams, although some brakes may use pneumatically operated actuator rams. In brake systems that employ fluid powered (hydraulic or pneumatic power) actuator rams, the actuator ram may be coupled to a power source via a brake servo valve ("BSV") and a shutoff valve ("SOV"). The SOV effectively functions as a shutoff valve, wherein in a first position (e.g., an armed position), fluid pressure is permitted to pass through the valve, while in a second position (e.g., a disarmed position) fluid pressure is prevented or restricted from passing through the valve. During normal braking, the SOV is in the armed position, thereby permitting the flow of fluid pressure. The BSV, based on braking commands from the pilot (often via an electronic controller that may implement, for example, anti-skid logic), controls the amount of fluid pressure provided to the actuator ram, and thus, the braking force applied to the wheel. To prevent or minimize unintentional braking (e.g., due to a faulty servo valve) at various times, the SOV is set in the disarmed position, thereby removing fluid pressure from the BSV. Since the BSV does not receive fluid pressure, it cannot provide fluid pressure to the ram, and thus, braking cannot be effected.

In electronic brakes, a brake controller is coupled to one or more electromechanical actuator controllers ("EMAC") for a brake, which drives one or more electromechanical brake actuators. The brake controller may be in communication with a brake pedal, and thus may control the EMAC in accordance with pilot/copilot braking commands.

Rotor disks and stator disks may be comprised of a friction material. A friction material may act to absorb the kinetic energy of the rotating wheel and convert the kinetic energy into heat. For example, rotor disks and stator disks may comprise a metal (e.g., steel), or a composite material. Two composite materials that may be used are carbon/carbon ("C/C") materials and ceramic matrix composite ("CMC") materials. In various embodiments, CMC materials and GC materials are used in a brake heat sink.

In various embodiments, CMC materials used herein may be manufactured by any suitable process, whether now known or hereinafter developed. For example, the CMC materials used may be made by processes disclosed in U.S. Pat. Nos. 6,855,428 and 7,378,362, which are incorporated herein by reference. For example, the CMC material may comprise a fibrous structure, comprising fibers, which are initially predominantly coated with elemental carbon to initially impregnate the fibrous structure. The fibers of that fibrous structure may then be subsequently predominantly impregnated with at least one ceramic material which is non-reactive with silicon, to further impregnate the fibrous structure. The composite material also may comprise a silicon matrix which is substantially continuous and predominantly surrounds and encompasses the fibrous structure, that fibrous structure which has already been initially predominantly impregnated with elemental carbon and subsequently predominantly impregnated with at least one ceramic material. The matrix ceramic material may have a fine grain crystalline structure of predominantly 20 microns or less in size. The at-least-one ceramic material may be discontinuous within that matrix. The fibrous structure fibers may pull out of the elemental carbon coating in response to the composite being subjected to fracture. As used herein, the word "predominantly" means, generally more so than not, or more often than not, depending on the context; in quantifiable terms it means more than half or more than 50%. The fibrous structure can be a plurality of elemental carbon fibers. The fibrous structure can be a plurality of either non-oxide ceramic fibers or oxide ceramic fibers.

The silicon matrix of the CMC material may be formed from an alloy comprising silicon, boron and carbon. The silicon matrix can be elemental silicon. Optionally, the silicon matrix may also include other alloying elements such as Al, Ni, Ca, Fe, etc. to modify other relevant chemical and/or physical properties of the ceramic matrix composites being produced, industrial grade silicon, readily available in the marketplace, in many cases, may have impurity levels which include sufficient boron and carbon to form the preferred alloy referred to above. Industrial grade silicons, as received from commercial suppliers, may already be that alloy referred to above, or may already include other acceptable alloying elements as mentioned above.

In various embodiments, in the foregoing process, the fibrous structure preform comprises a plurality of elemental carbon fibers. In various embodiments, a plurality of either non-oxide ceramic or oxide ceramic fibers may be used. Also, in the foregoing process, the molten silicon may be formed from an alloy comprising silicon, boron and carbon. In various embodiments, the molten silicon can be formed by melting elemental silicon. Finally, in the foregoing process, the at-least-one ceramic material may comprise boron carbide, although, as exemplified above, other ceramic materials may be used as long as they do not react with silicon to the extent that they degenerate the desired F&W properties. As indicated previously, the initial elemental carbon coating essentially encapsulates each of the plurality of elemental carbon fibers of said fibrous structure preform. In various embodiments, the foregoing process may include and further comprise the following steps: a.) producing a cover mix comprising the silicon alloy, carbon black and liquid phenolic resin; b.) essentially covering the green body with that cover mix; c.) (where more complex shapes are to be made, the optional step of) pre-heating the green body, covered with the cover mix, to solidify and set the liquid phenolic resin, thus forming a hardened cover mix (This step is not necessary where simple shapes are to be made.); and d.) heating up the green body, covered with either the hardened or unhardened cover mix, to the melting point range of the silicon alloy.

The silicon alloy preferably comprises a melt of 90 to 96 Wt. % elemental silicon, 3 to 6 Wt. % elemental boron and 0.5 to 2.0 Wt. % elemental carbon. The foregoing melt is then solidified, bringing the temperature back to ambient, and the solid is then crushed to −16 U.S. Sieve Size. Preferably, the cover mix comprises 90 to 92 Vol. % of crushed silicon alloy, 5.5 to 7.5 Vol, % of the liquid phenolic resin, and 1 to 3 Vol. % of carbon black. As explained hereinafter, the range of elements in the preferred silicon alloy produces what may be explained as an eutectic effect, lowering the melting temperature of the silicon by about 20° C. or slightly more. This effect seems to diminish and substantially disappear when the above stated ranges of alloying elements are violated. That is to say that when any of the foregoing alloying elements is beyond the foregoing stated ranges, the eutectic effect produced by this combination of elements tends to diminish and/or disappear. Also, preliminary experimental evidence indicates that additions of Al, Ca, Fe and/or Ni at alloying levels may be useful in significantly lowering the melting point of silicon. The capillary action of the silicon infiltration into the preform becomes somewhat less smooth when the carbon black is eliminated from the cover mix, resulting in potentially the formation of some minor voids in the silicon matrix. The phenolic resin range is set to get sufficient resin into the cover mix to set and harden, but not so much that when the silicon alloy melt temperature is attained, there is an over abundance of carbon which would tend to promote the excess formation of silicon carbide, a material that is to be avoided as is explained elsewhere herein.

In various embodiments, a CMC material may be made using chemical vapor infiltration ("CVI"). In such a process, a carbonized preform may be subjected to one or more ceramic or ceramic precursor gases. The gas infiltrates the carbonized preform and leaves a ceramic deposit within the preform.

In various embodiments, a composite material may comprise a fibrous structure which is initially predominantly impregnated with elemental carbon. That fibrous structure then subsequently has placed therein a plurality of holes. Each of those holes is within a range of about 1/16" in diameter and about 1/8" in diameter. Also, each of those holes, from its hole center, is spaced apart from the hole center of each other adjacent hole by a distance within a range of about 1/4" to about 1/2". The fibrous structure is then predominantly impregnated with at least one ceramic material.

In various embodiments, the C/C materials used may be made by any suitable process. For example, C/C material production may begin by forming continuous oxidized polyacrylonitrile (PAN) fibers, referred to as "OPF" fibers. These OFF fibers are precursors of carbon fibers and are used to fabricate a preformed shape composed of multiple layers. Typically, two or more layers are positioned onto a support plate and then needled together simultaneously or in a series of needling steps. During the needling process, multiple barbed needles are driven into the fibrous layers to displace a portion of the horizontal fibers into the z-direction. This action interconnects horizontal fiber layers into a multilayer board. Transport of the fibers by the barbed needles is a function of the stiffness and degree of freedom of the fibers, as well as other parameters. The polymeric nature of the OPF fibers allows transport of the low modulus fibers in the z-direction.

After the needling process is complete, the OPF fibers may be carbonized at high temperatures in a controlled environment to transform the preform into a high carbon content substrate. During the carbonization process, the preform loses approximately 50% of its mass and experiences a net increase in fiber density. Following this operation, the resulting fibrous carbon substrate may be densified in a densification process through chemical vapor deposition (CND) of pyrolytic carbon until the composite reaches the target density level.

A densification process may comprise placing preformed, carbonized porous structures in a furnace and introducing a high temperature reactant gas to the porous structures under a vacuum. A variety of porous structures and reactant gases may be used, but typically, a fibrous carbon porous structure is used with a reactant gas mixture of natural gas and/or propane gas. It is believed that when the hydrocarbon gas mixture flows around and through the porous structures, some of the carbon atoms separate from the hydrocarbon molecules, thereby depositing the carbon atoms within the interior and onto the surface of the porous structures. As a result, the porous structures become more dense over time as more and more of the carbon atoms are deposited onto the structures.

It was thought that CMC material and GC material were not suitable for use together in the same brake heat sink because the relative hardness of CMC material compared to C/C material would cause undue wear of the C/C material. C/C material brakes develop a "glaze" over time on the wear faces that acts a lubricant. Due to the difference in the material characteristics of the dissimilar disk materials, an appropriate glaze may not develop when C/C material is used adjacent to CMC material.

In various embodiments, dissimilar materials are used in an aircraft brake heat sink to improve various performance characteristics. In particular, the dissimilar materials may be dissimilar friction materials. The dissimilar friction materials may be adjacent to one another. For example, dissimilar friction materials may be adjacent to one another and, in response to axial compressive pressure, friction materials may be selectively placed into contact. In various embodiments, the dissimilar friction materials used are C/C materials and CMC materials. An aircraft brake having dissimilar friction materials of C/C materials and CMC materials may be referred to as a hybrid brake stack.

Figure 1:
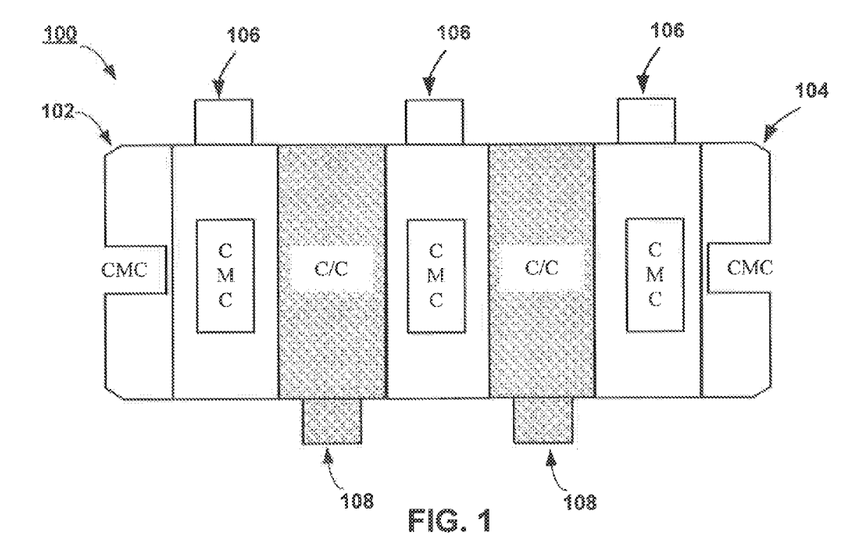
FIG. 1 illustrates a brake system in accordance with various embodiments.

For example, with reference to FIG. 1, aircraft brake stack 100 is illustrated. Rotor disks 108 are shown adjacent to stator disks 106. Rotor disks 108 comprise a C/C material while stator disks 106 comprise a CMC material. Pressure plate 102 and end plate 104 also comprise a CMC material. As described above, rotor disks 108 may rotate in accordance with an aircraft wheel. Stator disks 106 remain stationary relative to rotor disks 108 during rotation of rotor disks 108. One or more rams may axially urge pressure plate 102, whether directly or through an intermediate object, into forceful engagement with stator disks 106 and rotor disks 108. The axial compression of the stator disks 106 and rotor disks 108 causes friction between the stationary stator disks 106 and the rotating rotor disks 108, thus slowing rotor disks 108.

Figure 8:
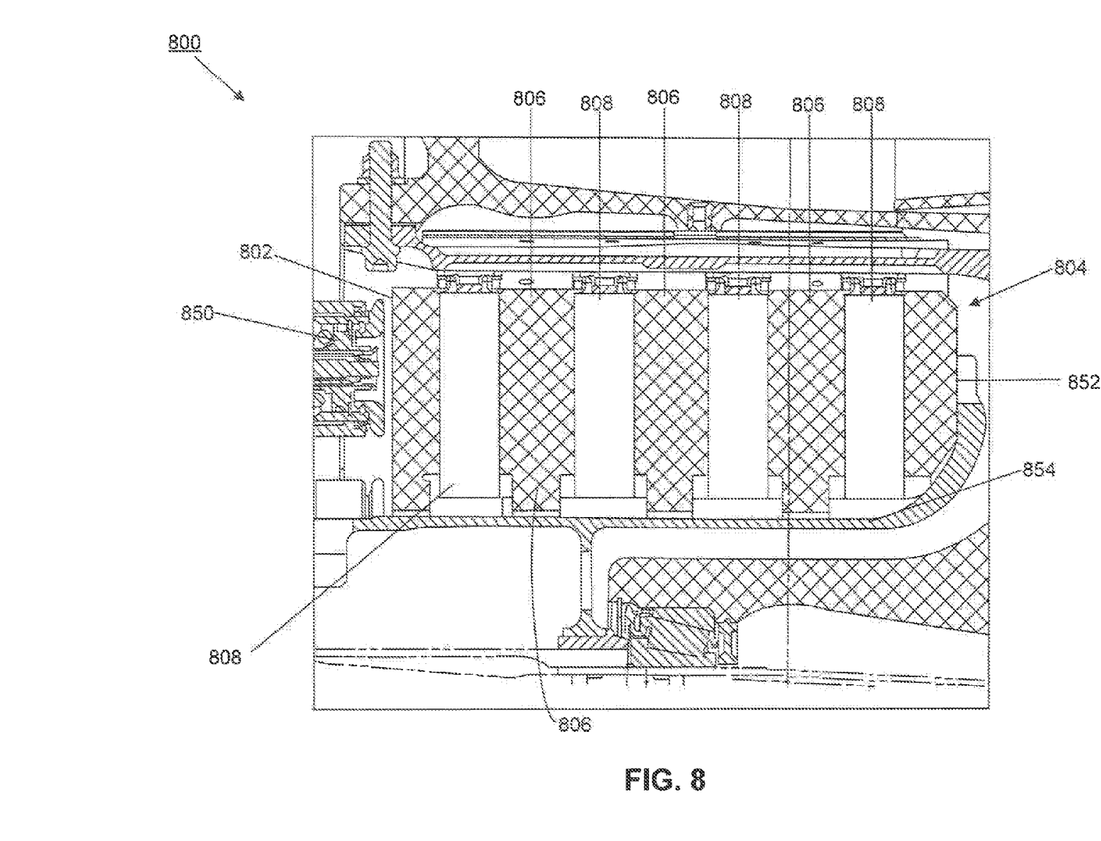
FIG. 8 illustrates a brake system in accordance with various embodiments, as configured within an aircraft brake.

With reference to FIG. 8, aircraft brake 800 is shown to further illustrate an aircraft brake with dissimilar friction materials. Rotor disks 808 are shown adjacent to stator disks 806. Rotor disks 808 comprise a C/C material while stator disks 806 comprise a CMC material. Pressure plate 802 and end plate 804 also comprise a CMC material. End plate 804 may be adjacent to or in contact with a torque tube back leg 852 of torque tube 854. As described above, rotor disks 808 may rotate in accordance with an aircraft wheel. Stator disks 806 remain stationary relative to rotor disks 808 during rotation of rotor disks 808. Ram 850 may axially urge pressure plate 802, whether directly or through an intermediate object, into forceful engagement with stator disks 806 and rotor disks 808. The axial compression of the stator disks 806 and rotor disks 808 causes friction between the stationary stator disks 106 and the rotating rotor disks 808, thus slowing rotor disks 808.

The use of a hybrid brake stack unexpectedly improves various brake performance metrics. For example, a hybrid brake stack may have a higher mean coefficient of dynamic friction across use cases and a lower deviation from the mean coefficient of dynamic friction across use cases. Importantly, a hybrid brake stack tends to have an improved coefficient of dynamic friction in a rejected take off ("RTO") use case than conventional brake stacks. Moreover, a hybrid brake stack tends to have a greater coefficient of static friction than conventional brake stacks.

Figure 4:
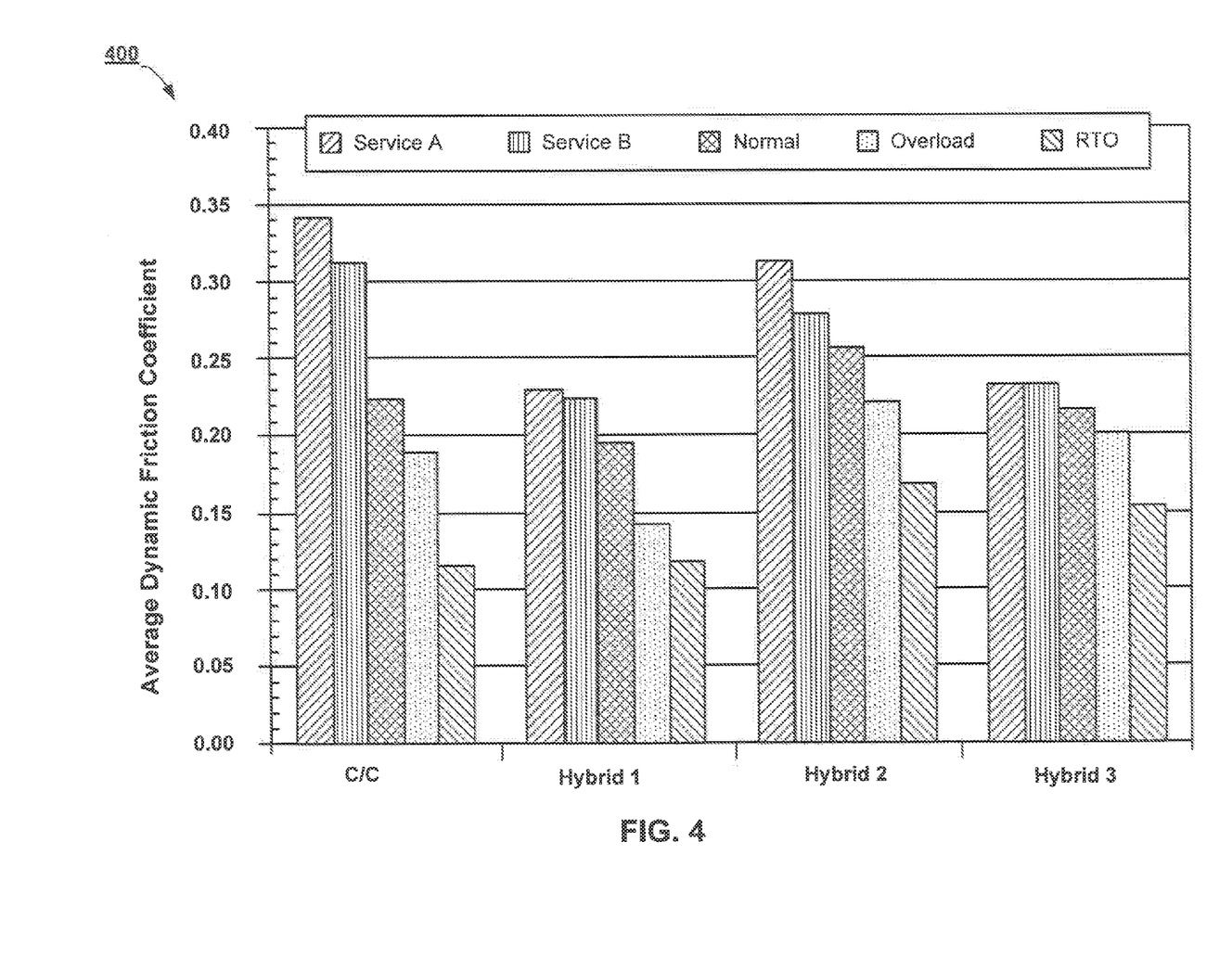
FIG. 4 illustrates a diagram of the coefficients of dynamic friction under varying conditions of C/C friction material and various configurations of friction material in accordance with various embodiments.

With reference to FIG. 4, graph 400 shows coefficients of dynamic friction of an all C/C material brake disk stack and three hybrid brake disk stacks. Hybrid 1 comprises a hybrid brake stack having rotating disks of a CMC material and stator disks of C/C materials. Both the rotors and stators of hybrid 1 had previously undergone extensive use in testing environments, including use in tests that simulate a RTO. Hybrid 2 comprises a hybrid brake stack having rotating disks of a CMC material and stator disks of C/C materials. The rotors and stators of hybrid 2 were new, i.e., they had not previously undergone extensive use in testing environments. Hybrid 3 comprises a hybrid brake stack having rotating disks of a C/C material and stator disks of a CMC materials. The rotors and stators of hybrid 3 were new, i.e., they had not previously undergone extensive use in testing environments. The coefficients of dynamic friction are shown along the y axis. The use cases are shown at the top of the graph along the x axis: Service A, Service B, Normal, Overload, and RTO.

Service A represents a use case with the lowest relative energy. The other use cases haves increasing associated amounts of energy. As shown, Hybrid 2 has a higher mean coefficient of dynamic friction than the C/C material alone. In addition, the deviation from the mean of coefficients of dynamic friction across use cases is lower for the hybrid brake stacks (hybrid 1 through hybrid 3) than a C/C material alone. This may also be thought of as a lower standard deviation across use cases. The lower deviation from the mean of coefficients of dynamic friction yields a brake disk stack that provides more consistent performance across use cases than conventional brake disk stacks. As shown in FIG. 4, the range of coefficients of dynamic friction is smaller for the hybrid brakes than the C/C material alone. The range may be measured by the difference between the maximum coefficient of dynamic friction and the minimum coefficient of dynamic friction for a given brake type. For the C/C material, as shown, the difference between the maximum coefficient of dynamic friction and the minimum coefficient of dynamic friction is about 0.22, wherein the term about, when used in connection with the difference between the maximum coefficient of dynamic friction and the minimum coefficient of dynamic friction, may mean +/-0.05. However, for Hybrid 2, for example, the difference between the maximum coefficient of dynamic friction and the minimum coefficient of dynamic friction is about 0.15. The more narrow range shown by the hybrid configuration allows for improved braking performance, among other benefits.

Figure 5:
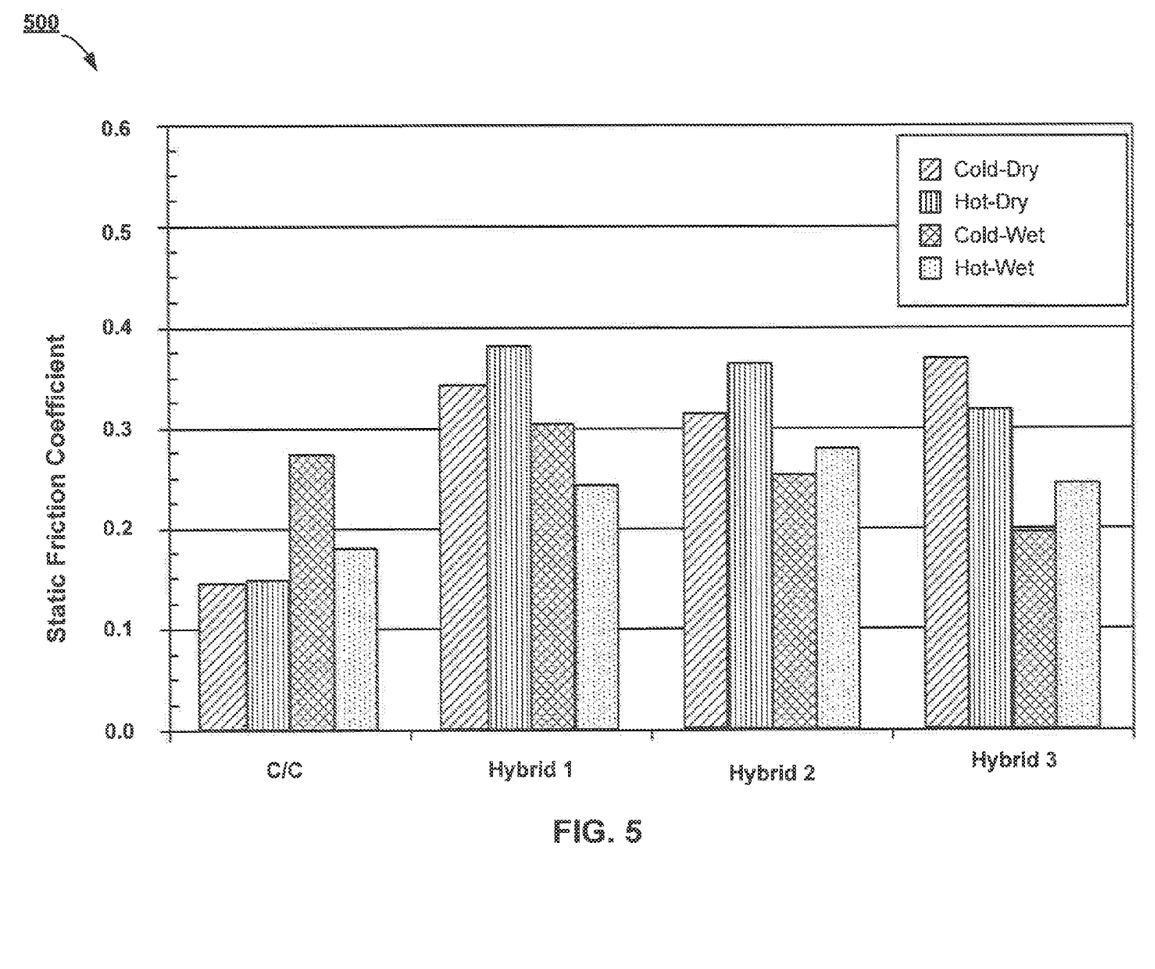
FIG. 5 illustrates a diagram of the coefficients of static friction under varying conditions of C/C friction material and various configurations of friction material in accordance with various embodiments.

With reference to FIG. 5, graph 500 shows coefficients of static friction of an all C/C material brake disk stack and three hybrid brake disk stacks. Hybrid 1, Hybrid 2, and Hybrid 3 are the same as described above with reference to graph 400. In graph 500, the coefficients of static friction are shown along the y axis. The use cases are shown at the top of the graph along the x axis: Cold-Dry, Hot-Dry, Cold-Wet, Hot-Wet. As shown, each of Hybrid 1, Hybrid 2, and Hybrid 3 have higher mean coefficients of static friction than the C/C material alone. Improved static friction tends to enhance the ability of a brake stack to resist motion while in a static state such as, for example, when used to hold an aircraft while stationary. Moreover, a hybrid brake stack may provide improved combinations of static friction and dynamic friction performance. For example, a hybrid brake stack may provide a suitable minimum coefficient of static friction coupled with a maximum coefficient of dynamic friction.

Figure 3:
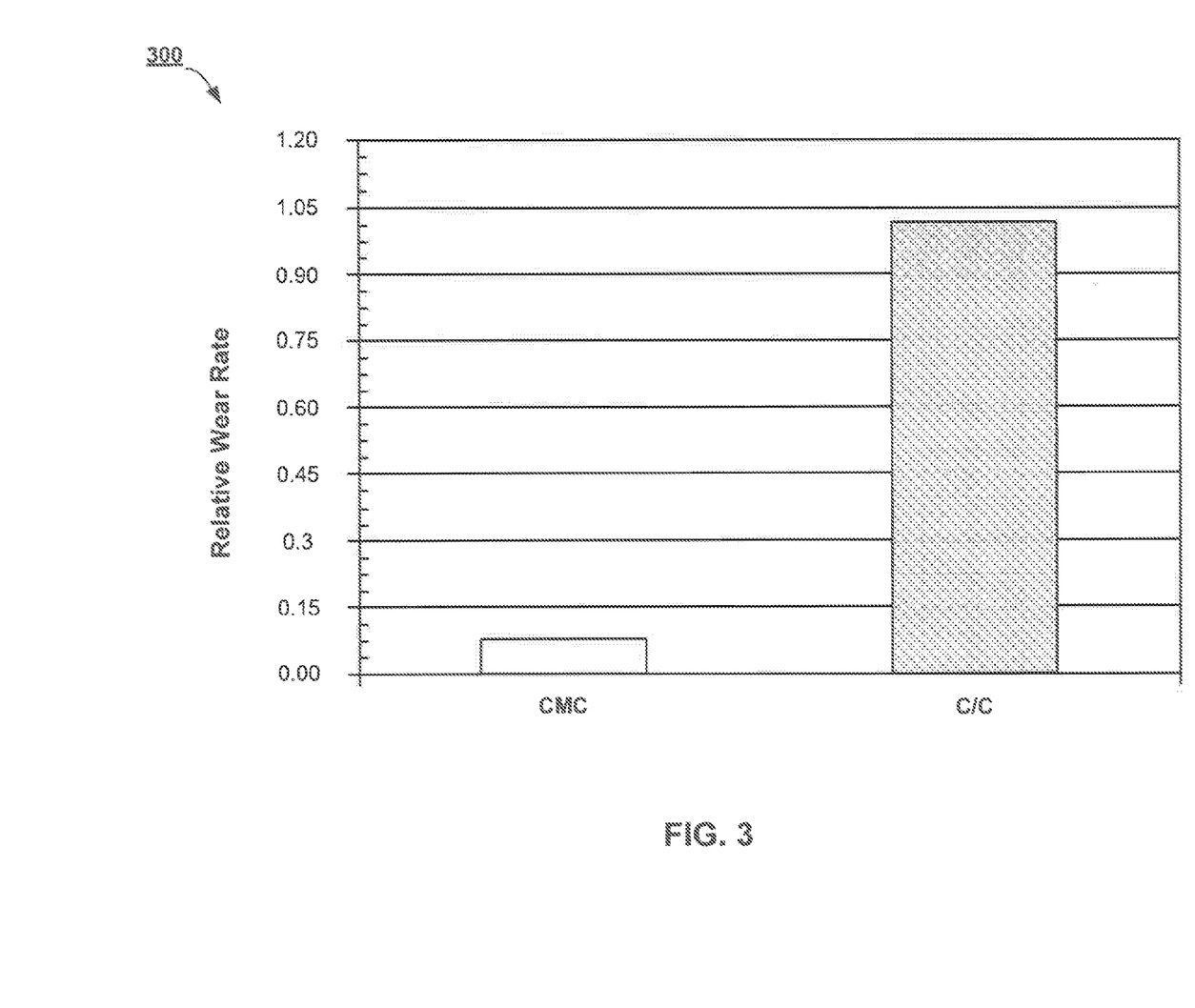
FIG. 3 illustrates a diagram of relative wear rate of C/C and CMC friction material in accordance with various embodiments.

With regard to wear life, CMC materials tend to wear more slowly than C/C materials. For example, as shown in graph 300 in FIG. 3, CMC materials are tested to reveal a wear life that is significantly longer than a C/C material. As shown in FIG. 3, C/C materials may be said to have a relative wear rate of HI Using the wear rate of a C/C material as a reference, CMC materials may have a wear rate of about 0.15, wherein the term about may indicate +/-0.1 when used in connection with the relative wear rate of CMC materials against C/C materials. Accordingly, in a hybrid brake, the maintenance intervals may not be significantly longer or shorter than the maintenance intervals for brakes comprised of C/C material only. This difference in wear life allows for the design of a brake where only half of the disks need to be replaced during the normal brake overhaul process. Since the CMC disks in the hybrid brake design have such extremely low wear, they can be viewed as relatively non-wearing components and can be re-used without replacement when the C/C disks are replaced with new or refurbished disks. Such wear characteristics reduce overall costs, as fewer than all the friction material components may be replaced at each maintenance interval.

Figure 2:
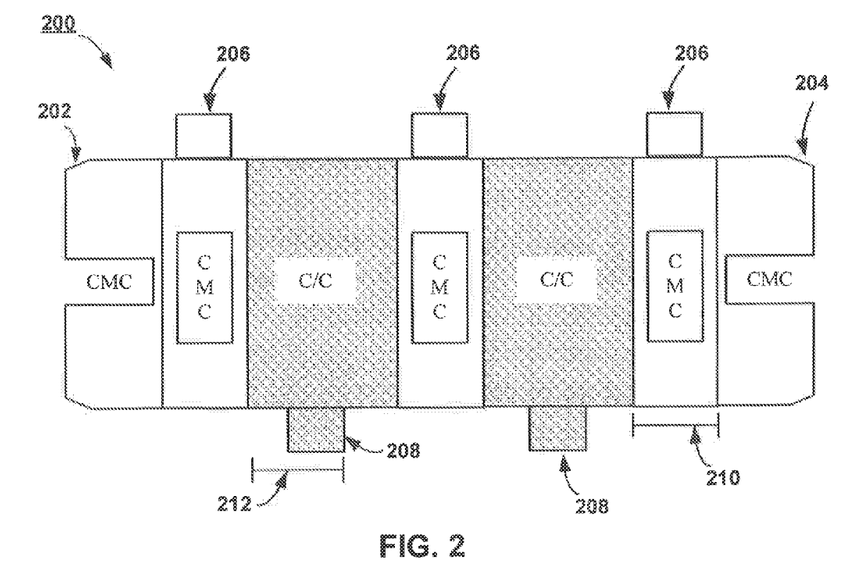
FIG. 2 illustrates an additional brake system in accordance with various embodiments.

In that regard, to further leverage the differences in wear rate, a hybrid brake may comprise C/C material and CMC materials of varying thicknesses. For example, FIG. 2 shows aircraft brake stack 200. Rotor disks 208 are shown adjacent to stator disks 206. Rotor disks 208 comprise a GC material while stator disks 206 comprise a CMC material. Pressure plate 202 and end plate 204 also comprise a CMC material. As described above, rotor disks 208 may rotate in accordance with an aircraft wheel. Stator disks 206 remain stationary relative to rotor disks 208 during rotation of rotor disks 208. One or more rams may axially urge pressure plate 202, whether directly or through an intermediate object, into forceful engagement with stator disks 206 and rotor disks 208. The axial compression of the stator disks 206 and rotor disks 208 causes friction between the stationary stator disks 206 and the rotating rotor disks 208, thus slowing rotor disks 208.

Rotor disks 208 are shown with thickness 212. As illustrated with thickness 212, the thickness of rotor disks 208 may be measured by axial distance. Stator disks 206 are shown with thickness 210. Thickness 210 is less than thickness 212. In various embodiments, thickness 212 may be from about 101% to about 500% greater than thickness 210, more preferably from about 125% to about 400% greater than thickness 210, and more preferably from about 150% to about 200% greater than thickness 210. For example, thickness 212 may be from 1.5 times to 3 times thickness 210. As shown in FIG. 2, thickness 212 is about 200% greater than thickness 210. In this regard, given the higher wear rate of C/C material, the maintenance interval of aircraft brake stack 200 may be longer than the maintenance interval of aircraft brake stack 100. The thickness of rotor disks 208 may be adjusted to benefit from maintenance at the same time as stator disks 206 or multiples thereof. For example, the thickness of rotor disks 208 may be adjusted so that stator disks 206 may be replaced every other time rotor disks 208 are replaced.

In various embodiments, an aircraft brake disk stack may comprise rotating disks comprised of CMC materials and stator disks of C/C materials. For example, with reference to FIG. 6, aircraft brake stack 600 is illustrated. Rotor disks 608 are shown adjacent to stator disks 606. Rotor disks 608 comprise a CMC material while stator disks 606 comprise a C/C material. Pressure plate 602 and end plate 604 also comprise a CMC material. As described above, rotor disks 608 may rotate in accordance with an aircraft wheel. Stator disks 606 remain stationary relative to rotor disks 608 during rotation of rotor disks 608. One or more rams may axially urge pressure plate 602, whether directly or through an intermediate object, into forceful engagement with stator disks 606 and rotor disks 608. The axial compression of the stator disks 606 and rotor disks 608 causes friction between the stationary stator disks 606 and the rotating rotor disks 608, thus slowing rotor disks 608.

Figure 6:
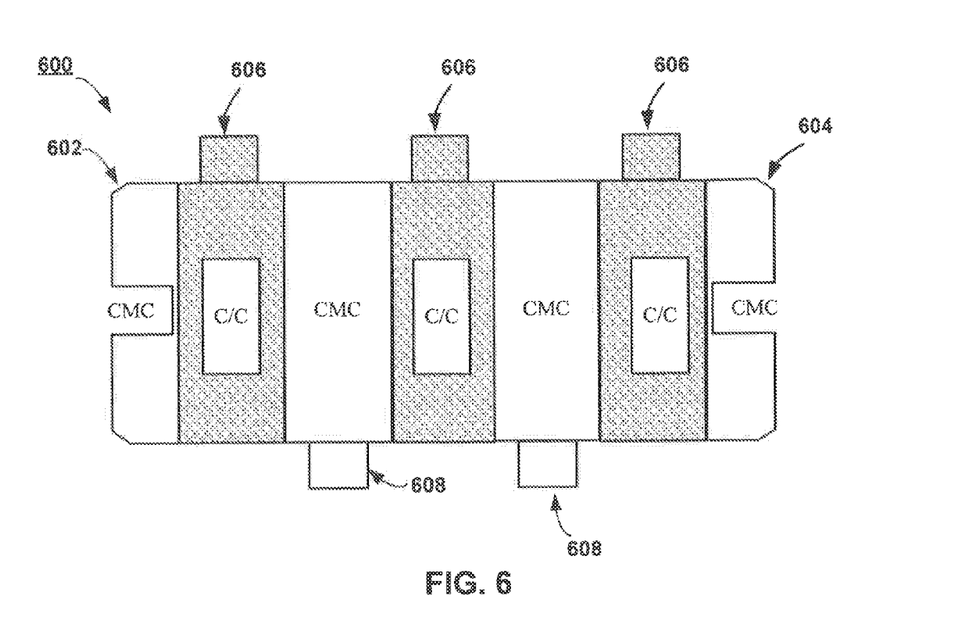
FIG. 6 illustrates a brake system in accordance with various embodiments.

In such embodiments, the use of CMC material in pressure plate 602 and end plate 604 may be beneficial in that CMC materials are typically more resistant to oxidation than C/C materials. Pressure plate 602 and end plate 604 are more likely to be exposed to environmental contaminants such as de-icer, and CMC materials are more resistant to damage from such contaminants. For example, acetate based de-icers may be detrimental to the oxidation resistance of C/C materials. In addition, formate based de-icers also may be detrimental to the oxidation resistance of C/C materials. Thus, where acetate based de-icers are contemplated, pressure plates and end plates comprised of CMC materials tend to provide improved oxidation resistance. In various embodiments, however, CMC materials may be used as a pressure plate and end plate in aircraft brake stacks having rotating disks comprised of C/C materials and stator disks of CMC materials.

In various embodiments, a hybrid brake stack may comprise C/C materials and CMC materials of varying thicknesses in embodiments having rotating disks comprised of CMC materials and stator disks of C/C materials. As CMC materials tend to be more expensive to produce than C/C materials, it may be beneficial to use CMC materials in configurations where there are fewer CMC materials than C/C materials. In various embodiments, however, CMC materials may outnumber C/C materials, as CMC materials tend to wear longer than C/C materials. However, in various embodiments, there are the same number of CMC components used as C/C components.

Figure 7:
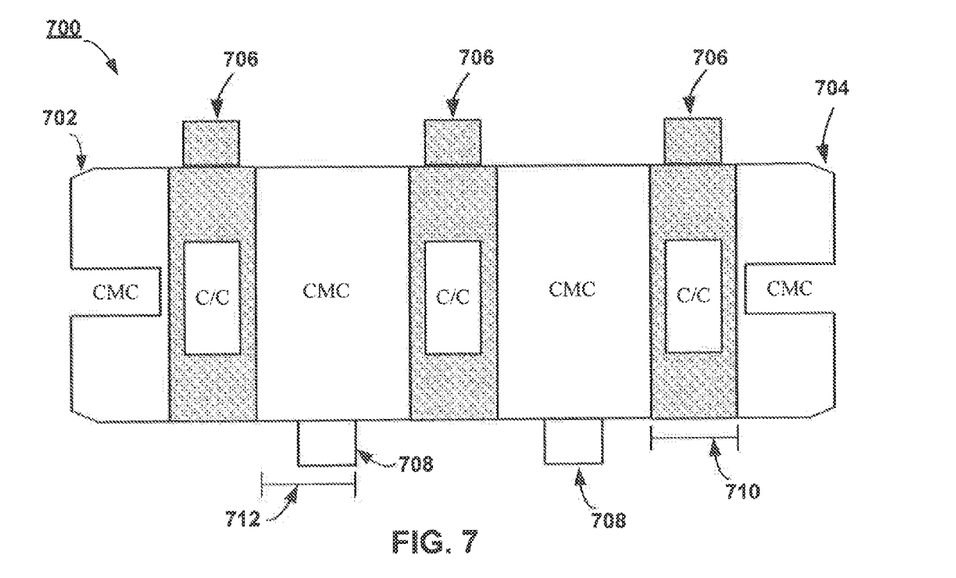
FIG. 7 illustrates an additional brake system in accordance with various embodiments.

For example, FIG. 7 shows aircraft brake stack 700. Rotor disks 708 are shown adjacent to stator disks 706. Rotor disks 708 comprise a CMC material while stator disks 706 comprise a C/C material. Pressure plate 702 and end plate 704 also comprise a CMC material. As described above, rotor disks 708 may rotate in accordance with an aircraft wheel. Stator disks 706 remain stationary relative to rotor disks 708 during rotation of rotor disks 708. One or more rams may axially urge pressure plate 702, whether directly or through an intermediate object, into forceful engagement with stator disks 706 and rotor disks 708. The axial compression of the stator disks 706 and rotor disks 708 causes friction between the stationary stator disks 706 and the rotating rotor disks 708, thus slowing rotor disks 708.

Rotor disks 708 are shown with thickness 712. As illustrated with thickness 712, the thickness of rotor disks 708 may be measured by axial distance. Stator disks 706 are shown with thickness 710. Thickness 710 is less than thickness 712. In various embodiments, thickness 712 may be from about 101% to about 500% greater than thickness 710, more preferably from about 125% to about 400% greater than thickness 710, and more preferably from about 150% to about 200% greater than thickness 710. For example, thickness 712 may be from 1.5 times to 3 times thickness 710. As shown in FIG. 2, thickness 712 is about 200% greater than thickness 710. In this regard, given the higher wear rate of C/C material, the maintenance interval of aircraft brake stack 700 may be longer than the maintenance interval of aircraft brake stack 100. The thickness of rotor disks 708 may be adjusted to benefit from maintenance at the same time as stator disks 706 or multiples thereof. For example, the thickness of stator disks 706 may be adjusted so that stator disks 706 may be replaced every two times prior to stator disks 706 being replaced.

Systems, methods and computer program products are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for," As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A brake disk stack comprising a carbon/carbon ("C/C") rotor disk adjacent to a ceramic matrix composite ("CMC") stator disk, an end plate comprising a CMC component and a pressure plate comprising a CMC component.

2. The brake disk stack of claim 1, wherein the C/C rotor disk is of substantially the same thickness as the CMC stator disk.

3. The brake disk stack of claim 1, wherein a thickness of the C/C rotor disk is not equal to a thickness of the CMC stator disk.

4. The brake disk stack of claim 3, wherein the thickness of the C/C rotor disk is equal to from about 1.5 to about 3 times the thickness of the CMC stator disk.

5. The brake disk stack of claim 1, wherein a second C/C rotor disk is adjacent to the CMC stator disk.

6. The brake disk stack of claim 1, wherein a C/C stator disk is adjacent to the CMC rotor disk.

7. A method of manufacturing a brake disk stack comprising:
   disposing a carbon/carbon ("C/C") rotor disk in the brake disk stack;
   disposing a ceramic matrix composite ("CMC") stator disk adjacent to the C/C rotor disk;
   placing an end plate comprising a CMC component and a pressure plate comprising a CMC component in the brake disk stack.

8. The method of claim 7, wherein the C/C rotor disk is of substantially the same thickness as the CMC stator disk.

9. The method of claim 7, wherein a thickness of the C/C rotor disk is not equal to a thickness of the CMC stator disk.

10. The method of claim 7, wherein the thickness of the C/C rotor disk is equal to from about 1.5 to about 3 times the thickness of the CMC stator disk.

11. The method of claim 7, further comprising disposing a second C/C rotor disk adjacent to the CMC stator disk.

* * * * *